(12) United States Patent
Maruyama et al.

(10) Patent No.: US 7,654,810 B2
(45) Date of Patent: Feb. 2, 2010

(54) INJECTION MOLDING MACHINE WHICH CARRIES OUT CONTROLLING OF CLOSING OPERATION OF A CHECK RING

(75) Inventors: Junpei Maruyama, Yamanashi (JP); Satoshi Takatsugi, Yamanashi (JP)

(73) Assignee: Fanuc Ltd., Yamanasahi (JP)

( * ) Notice: Subject to any disclaimer, the term of this patent is extended or adjusted under 35 U.S.C. 154(b) by 213 days.

(21) Appl. No.: 11/956,416

(22) Filed: Dec. 14, 2007

(65) Prior Publication Data

US 2009/0022839 A1 Jan. 22, 2009

(30) Foreign Application Priority Data

Jul. 19, 2007 (JP) .............................. 2007-188512

(51) Int. Cl.
*B29C 45/77* (2006.01)
(52) U.S. Cl. ....................................... 425/145; 425/149
(58) Field of Classification Search ................. 425/145, 425/149, 150
See application file for complete search history.

(56) References Cited

U.S. PATENT DOCUMENTS 7,037,452 B1 * 5/2006 Speight ....................... 425/145
7,431,870 B2 * 10/2008 Speight ....................... 425/145

FOREIGN PATENT DOCUMENTS

| JP | 478380 B | 3/1972 |
| JP | 60-201921 A | 10/1985 |
| JP | 62-019423 A | 1/1987 |
| JP | 62-060621 A | 3/1987 |
| JP | 03-045325 A | 2/1991 |
| JP | 04-071817 A | 3/1992 |
| JP | 04201225 | 7/1992 |
| JP | 09-174629 A | 7/1997 |

OTHER PUBLICATIONS

EP Search Report for 07123269.8 dated Oct. 15, 2008.

* cited by examiner

*Primary Examiner*—Tim Heitbrink
(74) *Attorney, Agent, or Firm*—Lowe Hauptman Ham & Berner, LLP

(57) ABSTRACT

While a check ring of a screw of an injection molding machine is in open state, an absolute value ($|\Delta$ resin pressure/$\Delta$ rotation amount$|$) of a variation of a resin pressure per unit variation of the screw reverse rotation becomes greater than a predetermined reference value. However, after the check ring is closed, $|\Delta$ resin pressure/$\Delta$ rotation amount$|$ becomes equal to or less than the reference value. From this, detecting if the $|\Delta$ resin pressure/$\Delta$ rotation amount$|$ during reverse rotation of the screw, it is possible to determine that the check ring is closed or not. As a result, it is possible to obtain a screw reverse rotation amount which is optimal for reliably closing the check ring.

5 Claims, 5 Drawing Sheets

INJECTION MOLDING MACHINE WHICH CARRIES OUT CONTROLLING OF CLOSING OPERATION OF A CHECK RING

RELATED APPLICATIONS

The present application is based on, and claims priority from, Japanese Application Number 2007-188512, filed Jul. 19, 2007, the disclosure of which is hereby incorporated by reference herein in its entirety.

BACKGROUND OF THE INVENTION

1. Field of the Invention

The present invention relates to an injection molding machine, and more particularly, to an injection molding machine which determines a closing state of a check ring based on a variation of a resin pressure when a screw is rotated by a constant amount to carry out controlling of closing operation of a check ring.

2. Description of the Related Art

A screw of an inline injection molding machine is provided with a check ring. There are various kinds of check rings and as a representative check ring, there is a known check ring in which a pressure in front of the check ring is relatively higher than a pressure behind the check ring, and a pressure difference is generated, thereby closing the valve.

It is known in Japanese Patent Application Laid-open No. 62-060621 that a screw is rotated in reverse (in a direction opposite from the rotation direction of the screw in a metering step) simultaneously when injection is started, and the check ring is closed.

It is known in Japanese Patent Applications Laid-open Nos. 3-45325, 4-71817 and 9-174629 that if the screw is normally rotated, a first resin flow path and a second resin flow path of the check ring are brought into communication with each other, and if the screw is rotated in reverse, the communication between the first resin flow path and the second resin flow path of the check ring is cut and they are sealed.

It is known in Japanese Examined Patent Publication No. 47-8380, and Japanese Patent Applications Laid-open Nos. 60-201921 and 62-19423 that if the screw is rotated in reverse, the check ring is relatively retreated from the screw to seal the resin flow path.

These check rings have a mechanism which opens and closes a flow path when the check ring rotates by a predetermined amount with respect to a screw head. In the injection molding machine having such a check ring, control is performed such that if the screw is rotated in reverse by a predetermined amount after the metering operation is completed, thereby closing the flow path and then, injection is carried out. A set value of the reverse rotation amount is calculated and set from a distance between the check ring when it is opened and a check seat.

When the screw rotates the screw in reverse head rotates in reverse at the same speed, and the check ring also rotates in reverse together with the screw head at a given speed. When the screw rotates by a predetermined amount, the rotation amount of the check ring with respect to the screw head is smaller than the reverse rotation amount of the screw. Therefore, when the screw is rotated in reverse to close the flow path, reverse rotation of the screw greater than reverse rotation obtained from a design value of a closing mechanism of the check ring is required.

A reverse rotation amount of the screw which is necessary to close the check ring is varied depending upon a viscosity of resin and the injection speed. Therefore, even if the calculated reverse rotation amount is set, the reverse rotation amount is insufficient and the check ring can not be closed perfectly or the reverse rotation amount becomes excessively large in some cases.

When the reverse rotation amount is insufficient and the flow path is not closed, there is inconvenience that resin reversely flows rearward of the screw during injection. When the flow path is closed but the reverse rotation amount is excessively large, resin reversely flows backward of the screw more than necessary during the reverse rotation, and there is inconvenience that the metering time is increased and resin resides too long in the cylinder.

SUMMARY OF THE INVENTION

Hence, it is an object of the present invention to provide an injection molding machine which controls such that a screw is rotated in reverse by a rotation amount which is most suitable for reliably closing a check ring of the screw. It is another object of the invention to provide an injection molding machine which measures a physical quantity required for injection molding when it is determined that the check ring is closed, thereby determining whether a molded article is non-defective or not. It is another object of the invention to provide an injection molding machine which measures a physical quantity required for injection molding when it is determined that the check ring is closed, thereby carrying out at least one of correction of an injection/hold pressure switching position and correction of an injection speed switching position.

The injection molding machine according to the present invention carries out closing control of the check ring by rotating the screw in reverse, and comprises: an injection screw having a check ring; rotary drive means for rotating and driving the screw; axial drive means for driving the screw in an axial direction of the screw; rotation amount detection means for detecting a reverse rotation amount of the screw; resin pressure detection means for detecting a resin pressure; resin pressure gradient detection means which rotates the screw in reverse in a state in which the screw is positioned in a predetermined position in the axial direction of the screw, and which detects an gradient of the resin pressure with respect to a reverse rotation amount of the screw in the closing control of the check ring based on the reverse rotation amount of the screw detected by the rotation amount detection means and the resin pressure detected by the resin pressure detection means; and check ring closing determination means which compares an absolute value of a resin pressure gradient detected by the resin pressure gradient detection means with a predetermined value, and which determines, based on the result of the comparison, that the check ring is closed or not.

The injection molding machine may further comprise means for obtaining the reverse rotation amount of the screw after the reverse rotation of the screw is started until the check ring closing determination means determines that the check ring is closed, and for displaying the obtained screw reverse rotation amount on a screen.

The injection molding machine may further comprise check ring closing control means for rotating the screw in reverse automatically until the check ring closing determination means determines that the check ring is closed.

In the injection molding machine, a physical quantity concerning injection may be detected at a point of time when the check ring closing determination means determines that the check ring is closed, and it is determined, based on the detected physical quantity, whether a molded article is non-defective or not.

In the injection molding machine, a physical quantity concerning injection may be detected at a point of time when the check ring closing determination means determines the check ring is closed, and the injection/hold pressure switching position or the injection speed switching position is corrected based on the detected physical quantity.

The physical quantity may be one or more of a resin pressure at check ring closing timing, a variation of the resin pressure from start of reverse rotation of the screw until check ring closing timing, and time elapsed after the reverse rotation of the screw is started until the check ring is closed.

Since the injection molding machine of the present invention has the above-described structure, it is possible to obtain closing timing of the check ring based on the variation of resin pressure when the screw is rotated by a given amount during reverse rotation of the screw, and it is possible to obtain the optimal reverse rotation amount, and to optimally control the reverse rotation. Since the screw reverse rotation amount until the check ring is closed is displayed on the screen, this information can be used as an index for setting the reverse rotation. Since the reverse rotation of the screw is automatically controlled until the check ring is closed, it is possible to reliably close the check ring, and it is possible to prevent the metering time from increasing and to prevent resin from residing too long in the cylinder. It is possible to determine whether a molded article is non-defective or not based on the pressure of closing timing of the check ring. By correcting the injection/hold pressure switching position based on the pressure of the closing timing of the check ring, it is possible to stabilize the filling amount of resin at the time of injection and hold pressure.

BRIEF DESCRIPTION OF THE DRAWINGS

The above and other objects and features of the present invention will be apparent from the description of the following embodiment with reference to the drawings. Wherein.

DETAILED DESCRIPTION OF THE PREFERRED EMBODIMENTS

Figure 1:
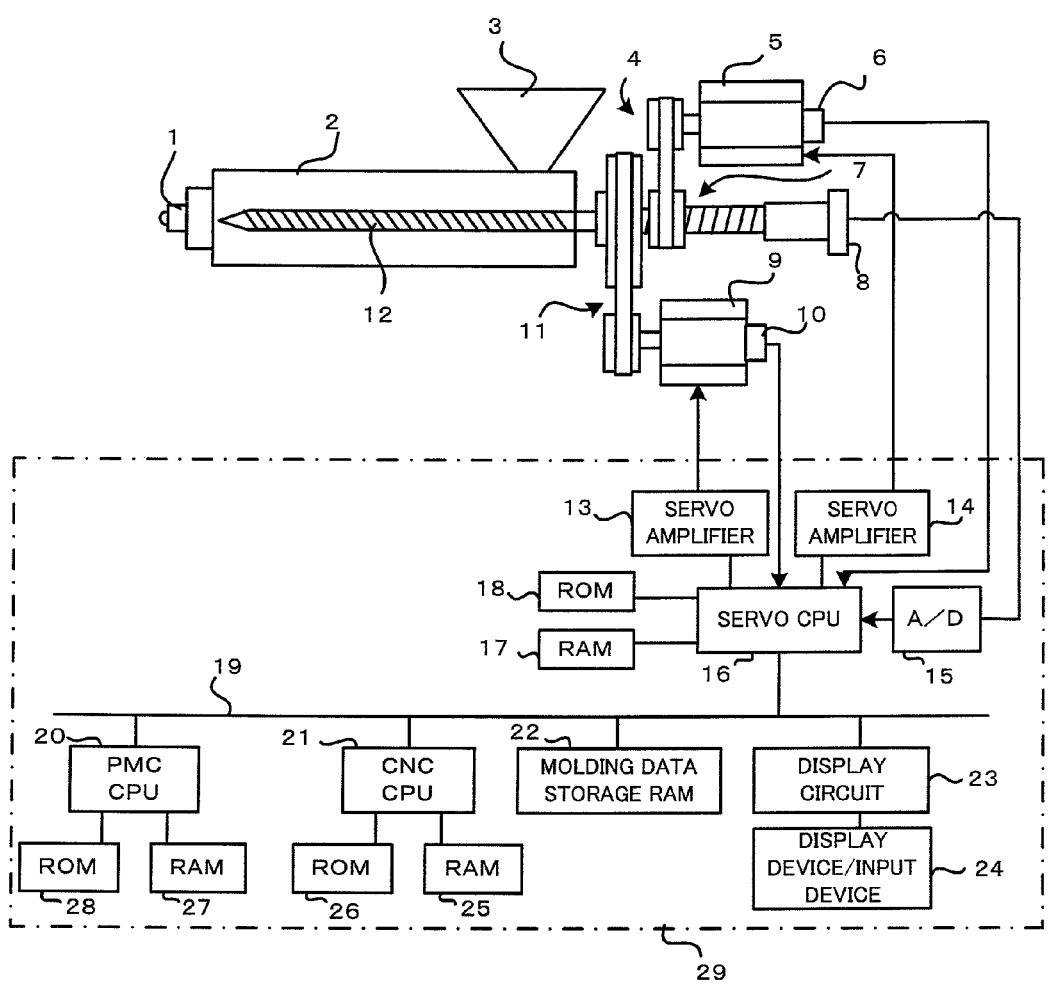
FIG. 1 is a block diagram of an essential portion of an injection molding machine according to an embodiment of the present invention.

FIG. 1 is a block diagram of an essential portion of an injection molding machine according to an embodiment of the present invention.

A nozzle 1 is mounted on a tip end of an injection cylinder 2 into which a screw 12 is inserted. A hopper 3 which supplies resin pellet into the injection cylinder 2 is mounted on a rear end of the injection cylinder 2. The screw 12 is rotated and driven by a metering servomotor 9 through a transmission mechanism 11. Further, this screw 12 is driven in its axial direction by an injection servomotor 5 through a transmission mechanism 4 and a converting mechanism 7 which converts rotation of ball screw/nut and the like into linear motion, so that injection control and back pressure control are carried out.

Position/speed detectors 6 and 10 which detect rotation position/speed are mounted on the injection servomotor 5 and the metering servomotor 9, respectively. The position/speed detectors 6 and 10 detect a rotation position and a speed of the screw 12, a position and a speed (injection speed) of the screw 12 in its axial direction.

A controller 29 which controls this injection molding machine includes a CNC CPU 21 which is a microprocessor for numerical control, a PMC CPU 20 which is a microprocessor for a programmable machine controller, and a servo-CPU 16 which is a microprocessor for servo-controlling. These microprocessors select mutual input and output through a bus 19 so that they can transmit information therebetween.

A ROM 18 in which dedicated servo control programs for carrying out processing of a position loop, speed loop and a current loop are accommodated, and a RAM 17 which is used for temporarily storing data are connected to the servo-CPU 16. A pressure sensor 8 is provided on the side of a main body of the injection molding machine and detects various pressures such as injection pressure. This pressure sensor 8 is connected to the servo-CPU 16 through an A/D (analogue/digital) converter 15. As the pressure sensor 8, a load converter (load cell) is used, for example.

A servo-amplifier 14 which drives the injection servomotor 5, connected to an injection axis, based on a command from the servo-CPU 16, and a servo-amplifier 13 which drives the metering servomotor 9, connected to a rotation axis of the screw, are connected to the servo-CPU 16. Outputs from the position/speed detectors 6 and 10 respectively mounted on the servomotors 5 and 9 are fed back to the servo-CPU 16. Rotation positions of the servomotors 5 and 9 are calculated by the servo-CPU 16 based on position feedback signals from the position/speed detectors 6 and 10, and they are renewed and stored in current position storing registers.

FIG. 1 only shows the servomotors 5 and 9 which drives the injection axis and the screw rotation axis, the position/speed detectors 6 and 10 which detect the rotation positions/speeds of the servomotors 5 and 9 and the servo-amplifiers 14 and 13, but a clamping axis for closing and clamping the mold and an ejector axis for taking a molded article out from the mold, and structures of the respective axes (servomotor, amplifier, position/speed detector and the like) are the same as those and thus, they are omitted from FIG. 1.

A ROM 28 and a RAM27 are connected to the PMC CPU 20. The ROM 28 stores therein a sequence program for controlling sequence motion of the injection molding machine, a processing program for determining closing timing of the check ring which is related to the present invention, a processing program for determining whether a molded article is non-defective or not, and processing program for correcting the injection/hold pressure switching position and the injection speed switching position. The RAM27 is used for temporarily storing operation data. A ROM 26 in which automatically operating program for totally controlling the injection molding machine is stored and a RAM 25 used for temporarily storing operation data are connected to the CNC CPU 21.

A molding data storing RAM 22 which is a nonvolatile memory stores therein a molding condition, various setting values, a parameter, a macro variable which are related to the injection operation.

A manual data inputting device 24 has a display unit, and is connected to the bus 19 through a display circuit 23, allowing selection of graph display screen and function menu and inputting operation of various data. A CRT, a liquid crystal display and the like can appropriately be selected as the display unit. The display unit is provided with a later-described indicator which informs a user of the closing of the check ring. The display unit displays a screw reverse rotation amount until the check ring is closed, a result of determination whether an injection molded article is non-defective or not, a correcting amount of the injection/hold pressure switching position, and a correcting amount of the injection speed switching position.

According to the above-described structure, the PMC CPU 20 controls the sequences of the entire injection molding machine, and distributes moving commands to servomotors of respective axes based on the operation program stored in the ROM 26 and the molding conditions stored in the molding data storing RAM 22. The servo-CPU 16 performs servo control such as position loop control, speed loop control and current loop control in the same manner as in the case of a conventional technique based on moving commands distributed to the respective axes, and feedback signals of the positions and the speeds detected by the position/speed detectors 6 and 10. The servo-CPU 16 executes so-called digital servo processing and drives and controls the servomotors 5 and 9.

The above-described structure is the same as a controller of a conventional electric injection molding machine, and means for determining that the closing operation of the check ring of the invention is completed or not is constituted by this controller 29.

Figure 2A:
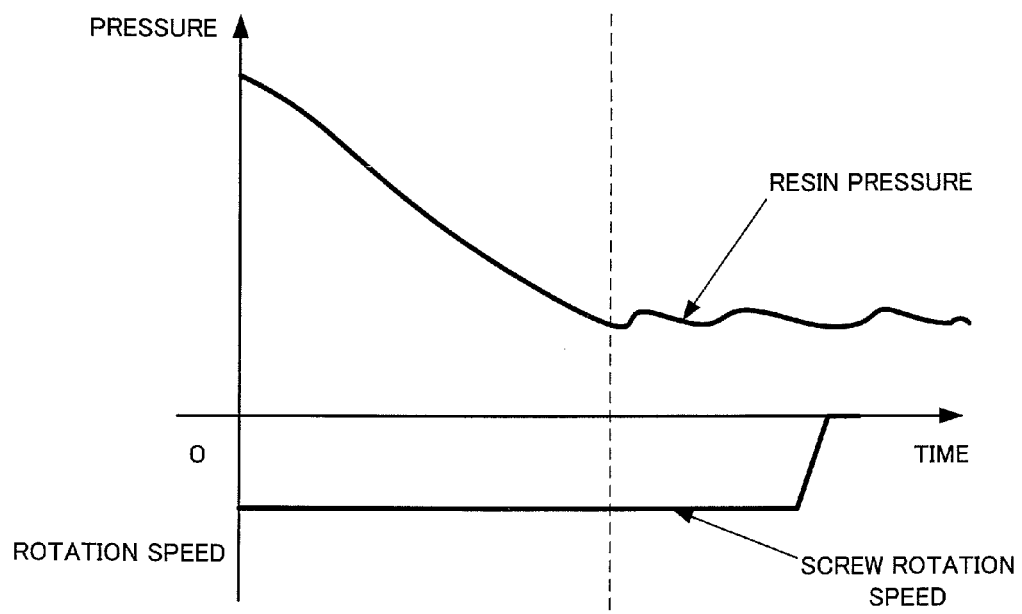
FIG. 2A is a graph showing a time-shift of resin pressure when a screw is rotated in reverse after metering.
Figure 2B:
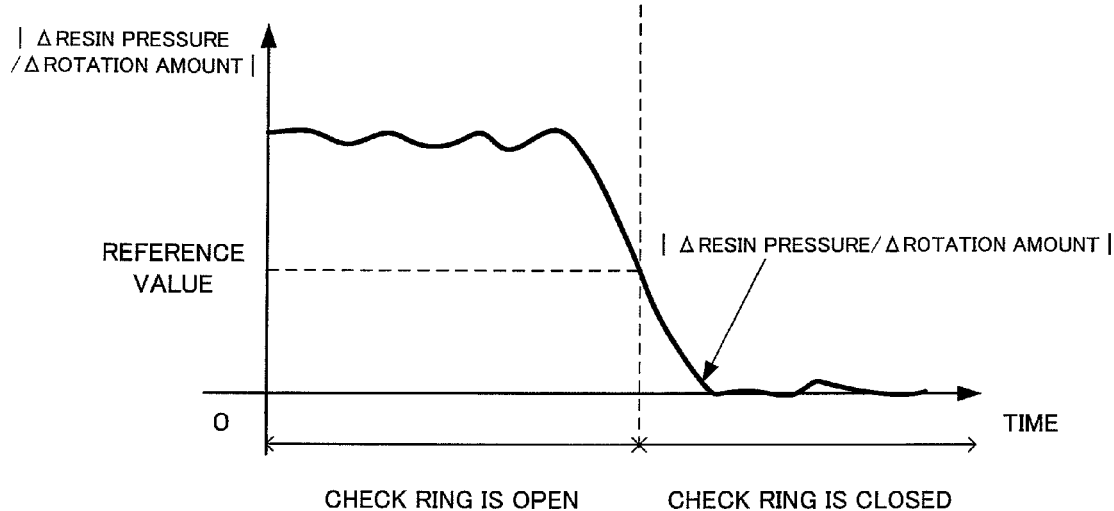
FIG. 2B is a graph showing a time-shift of gradient of resin pressure ($|\Delta$ resin pressure$/\Delta$ rotation amount$|$) when the screw is rotated in reverse after metering.

FIG. 2A is a graph showing a time-shift of resin pressure when the screw is rotated in reverse after metering. FIG. 2B is a graph showing variation in resin pressure gradient (|Δ resin pressure/Δ rotation amount|) with respect to time when the screw is rotated in reverse after metering, i.e., time-shift of variation (absolute value) of resin pressure with respect to unit rotation variation of the screw.

The graph of FIG. 2A will be explained. The check ring stays open when the reverse rotation of the screw is started after metering. Molten resin metered with a predetermined back pressure exists near the front and rear portions of the check ring. The resin pressure sensor (load cell) detects a resin pressure metered with the predetermined back pressure.

Here, if the screw is rotated in reverse in a state where the screw is positioned in the axial direction, the molten resin existing near a flight behind the check ring moves rearward of the screw. Therefore, the resin pressure behind the check ring is reduced. Since the check ring is in open state, molten resin starts flowing from the front side to the rear side of the check ring. As a result, resin pressure in front of the check ring is also reduced.

Then, if the check ring is closed by the reverse rotation of the screw, flowing of resin from the front side to the rear side of the check ring is stopped, and the resin pressure in front of the check ring is not reduced any more even if the screw is rotated in reverse. However, since the load cell detects a pressure of resin located in front of the check ring, the detected pressure of the load cell is not reduced even if the screw is rotated in reverse.

From the relation between the elapsed time and resin pressure shown in FIG. 2A, time-shift of the pressure gradient (|Δ resin pressure/Δ rotation amount|) shown in FIG. 2B is obtained. As shown in FIG. 2B, when the check ring is in open state, the pressure gradient (|Δ resin pressure/Δ rotation amount|) of the resin pressure with respect to the reverse rotation amount of the screw becomes greater than a predetermined reference value. After the check ring is closed, the pressure gradient assumes a value which is equal to or less than the predetermined reference value.

As explained above, during the reverse rotation of the screw, it is possible to determine that the check ring is closed based on the pressure gradient.

If the screw is moved in the axial direction when the screw is rotated in reverse, the absolute value of the pressure gradient does not become equal to or less than the reference value even if the check ring is in closed state, since the pressure of the resin located in front of the check ring is varied according to the movement of the screw. Therefore, in this case, it is not possible to determine whether the check ring is closed or not based on this pressure gradient. Thus, it is preferable that the screw is positioned in the axial direction during the reverse rotation of the screw. However, even if the screw is not completely stopped in the axial direction, it is possible to determine whether the check ring is closed or not if the screw is moving at such a low speed that the resin pressure is hardly varied.

Until the check ring is closed after the start of the reverse rotation of the screw, flow of resin from the front side to rear side of the check ring is generated, with the result that a metering volume of the resin is reduced. Thus, if the closing timing of the check ring varies, the reduction amount of resin volume varies, as a result, the metering volume also varies. Hence, a physical quantity to be used as an index of the reduction amount of resin during the screw reverse rotation is detected, and it is possible to determine whether a molded article is non-defective or not based on the detected physical quantity.

In the same manner as in the case where it is determined whether the molded article is non-defective or not, a physical quantity to be used as an index of a reduction amount of resin during the reverse rotation is detected, the variation in the metering volume is corrected to stabilize the filling amount of resin, it is possible to correct the injection/hold pressure switching position and the injection speed switching position. With this, even when the reduction amount of resin during the reverse rotation varies, it is possible to stabilize the filling amount in the subsequent the injection/hold pressure step.

The physical quantity mentioned above includes a resin pressure at the check ring closing timing, a variation in the resin pressure from the start of the reverse rotation until the check ring closing timing, a reverse rotation amount from the start of the reverse rotation until the check ring closing timing, and elapsed time from the start of the reverse rotation until the check ring closing timing.

Figure 3:
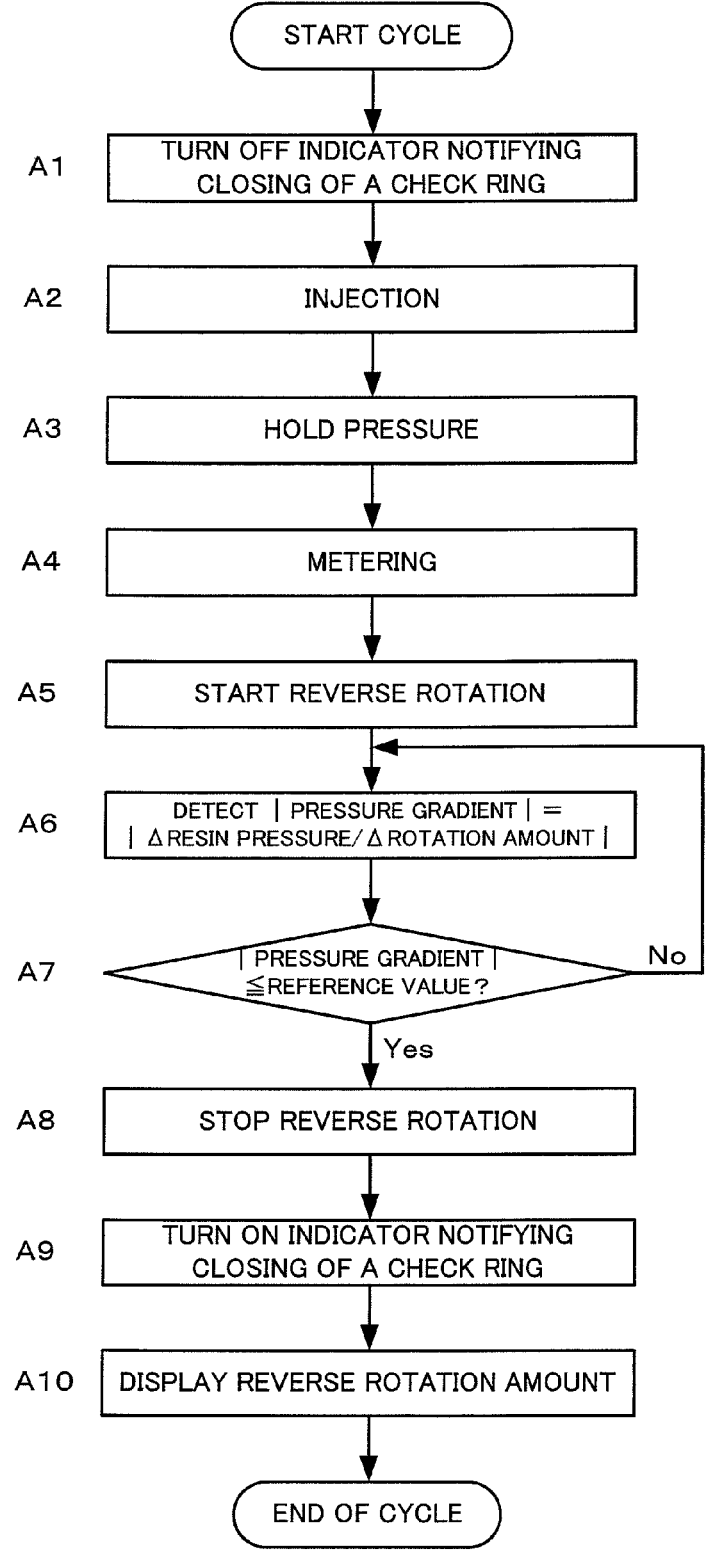
FIG. 3 is a flowchart showing an algorithm of one molding cycle including processing for determining whether a check ring is closed or not.

FIG. 3 is a flowchart showing an algorithm of one molding cycle including processing for determining whether the check ring is closed.

If the molding cycle is started, an indicator of closing of the check ring is turned off (step A1). Then, steps such as injection, hold pressure and metering are carried out (steps A1 to A4). If the metering step is completed, the reverse rotation of the screw is started (step A5). Then, an absolute value of variation of resin pressure with respect to unit rotation variation of the screw, i.e., an absolute value of pressure gradient, is obtained (step A6). To obtain the pressure gradient in step A6, the screw rotation amount and the resin pressure in the current cycle are detected, and the pressure gradient is calculated using the detected screw rotation amount and resin pressure, and the screw rotation amount and the resin pressure detected and stored in the last cycle.

Next, it is determined whether the absolute value of the pressure gradient obtained in this manner is equal to or less than a predetermined reference value (step A7). If the absolute value of the pressure gradient is not yet equal to or less than the reference value ('No' in determination in step A7), the procedure returns to step A6, and a further absolute value of the pressure gradient is obtained.

If the absolute value of the pressure gradient becomes equal to or less than the reference value ('Yes' in determination in step A7), on the other hand, the reverse rotation of the screw is stopped (step A8) The indicator which notifies that the check ring is closed is turned on (step A9), and the screw reverse rotation amount (the screw reverse rotation amount in the current cycle is obtained when calculating the pressure gradient in step A6) is displayed (step A10), and this cycle is completed.

By displaying the screw reverse rotation amount until the check ring is closed on the screen in this manner, it is made easy to set a reverse rotation amount of the screw.

Since the reverse rotation of the screw is automatically controlled until the check ring is closed, it is possible to reliably close the check ring, and it is possible to prevent the metering time from increasing and to prevent resin from residing too long in the cylinder.

In the molding cycle described above, steps of mold clamping, mold opening and taking out of a molded article are executed, but they are omitted in the flowchart in FIG. 3.

Figure 4:
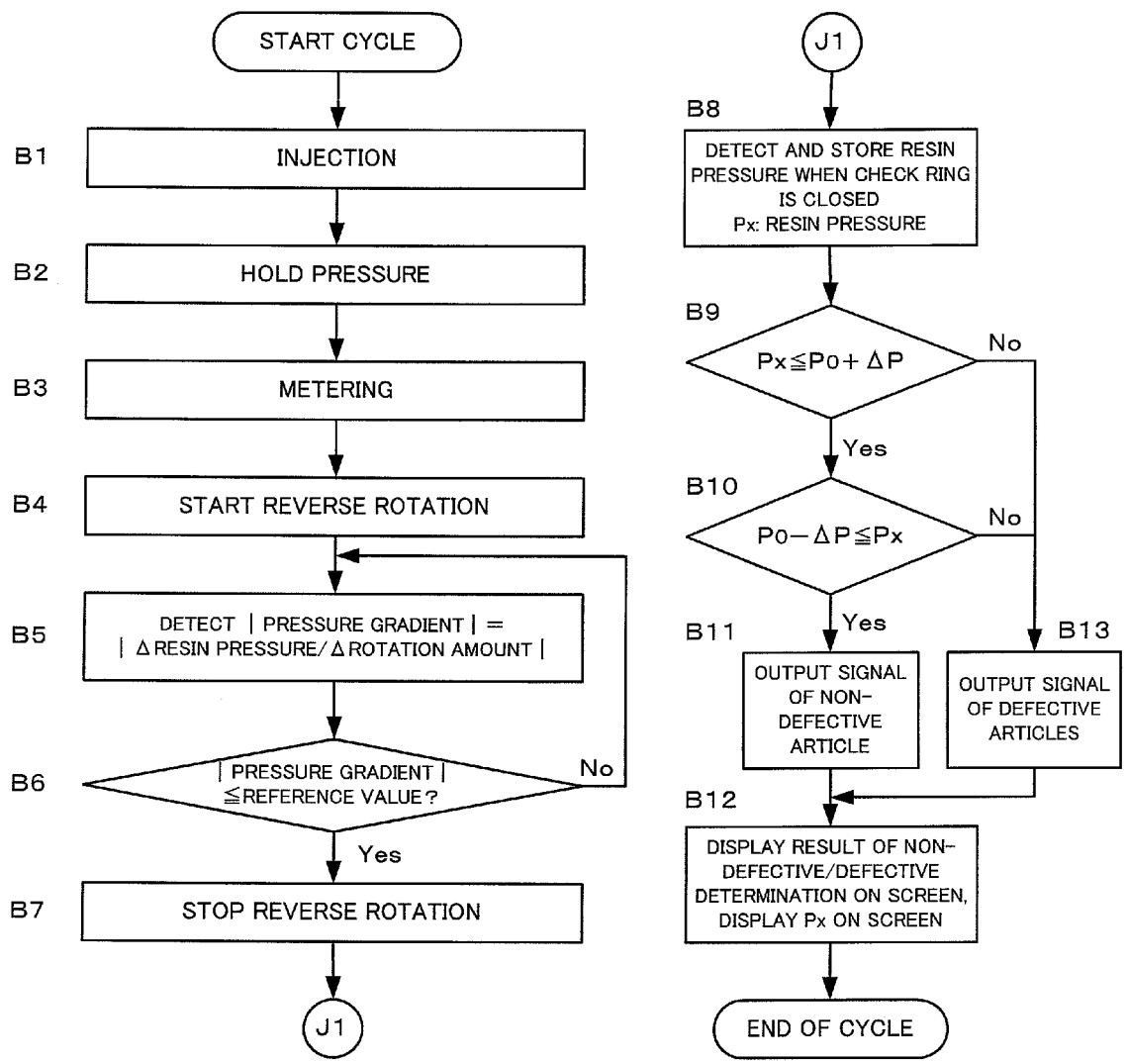
FIG. 4 is a flowchart showing an algorithm of one molding cycle including processing for determining whether a molded article is non-defective or not based on resin pressure at the time of check ring closing.

FIG. 4 is a flowchart showing an algorithm of one molding cycle including processing for determining whether a molded article is non-defective or not based on resin pressure at the time of check ring closing.

If the molding cycle is started, steps of injection, hold pressure and metering are carried out (steps B1 to B3). If the metering step is completed, the reverse rotation of the screw is started (step B4). Then, an absolute value of variation of resin pressure with respect to unit rotation variation of the screw, i.e., an absolute value of pressure gradient, is obtained (step B5).

Next, it is determined whether the absolute value of the pressure gradient obtained in this manner is equal to or less than a present reference value (step B6). If the absolute value of the pressure gradient is not yet equal to or less than the reference value ('No' in determination in step B6), the procedure returns to step B5, and an absolute value of the pressure gradient is further obtained.

If the absolute value of the pressure gradient becomes equal to or less than the reference value ('Yes' in determination in step B6), on the other hand, the reverse rotation of the screw is stopped (step B7), and a resin pressure Px at that time is detected and stored (step B8).

Then, it is determined whether the detected resin pressure Px is equal to or less than a value (=P0+ΔP) obtained by adding a permissible value ΔP to a reference pressure P0. If the detected resin pressure Px exceeds [P0+ΔP], a signal indicating that a molded article is defective is output (step B13). If the detected resin pressure Px equal to or less than [P0+ΔP] ('Yes' in determination in step B9), it is determined whether the detected resin pressure Px is equal to or less than a value (=P0−ΔP) obtained by subtracting a permissible value ΔP from the reference pressure P0 (step B10) If the detected pressure Px exceeds [P0−ΔP], a signal indicating that the molded article is non-defective is output (step B11), but if the detected pressure is equal to or less than [P0−ΔP], a signal indicating that the molded article is not non-defective is output (step B13). That is, if the resin pressure Px detected in step B8 falls within a range between the [P0+ΔP] (upper limit) and [P0−ΔP] (lower limit), the signal indicating that the molded article is non-defective is output in step B11, and if the detected resin pressure Px is departed from this range, the signal indicating that the molded article is not non-defective is output in step B13.

A determination result concerning whether a molded article is non-defective or not is output in step B11 or B13 and then, the output determination result is displayed on the screen of the display unit together with the detected resin pressure Px (step B12), and the current cycle is completed.

In this processing, it is determined that the molded article is non-defective or not if the resin pressure Px, which is a physical quantity, falls within the range of the reference pressure P0±ΔP (P0 represents reference pressure and ±ΔP represents a permissible range). Other physical quantities such as a pressure variation from the start of reverse rotation of the screw until the closing of the check ring, the screw reverse rotation amount from the start of the reverse rotation of the screw until the closing of the check ring, and time elapsed after the start of reverse rotation of the screw until the closing of the check ring may be employed, instead of the resin pressure Px, these physical quantities may be compared with corresponding reference value to determine whether a molded article is non-defective or not. Further, two or more of the physical quantities may be selected to determine whether the molded article is non-defective or not based on the selected physical quantities.

In the molding cycle, steps of mold clamping, mold opening and taking out of a molded article are executed, but they are omitted in the flowchart in FIG. 4.

Figure 5:
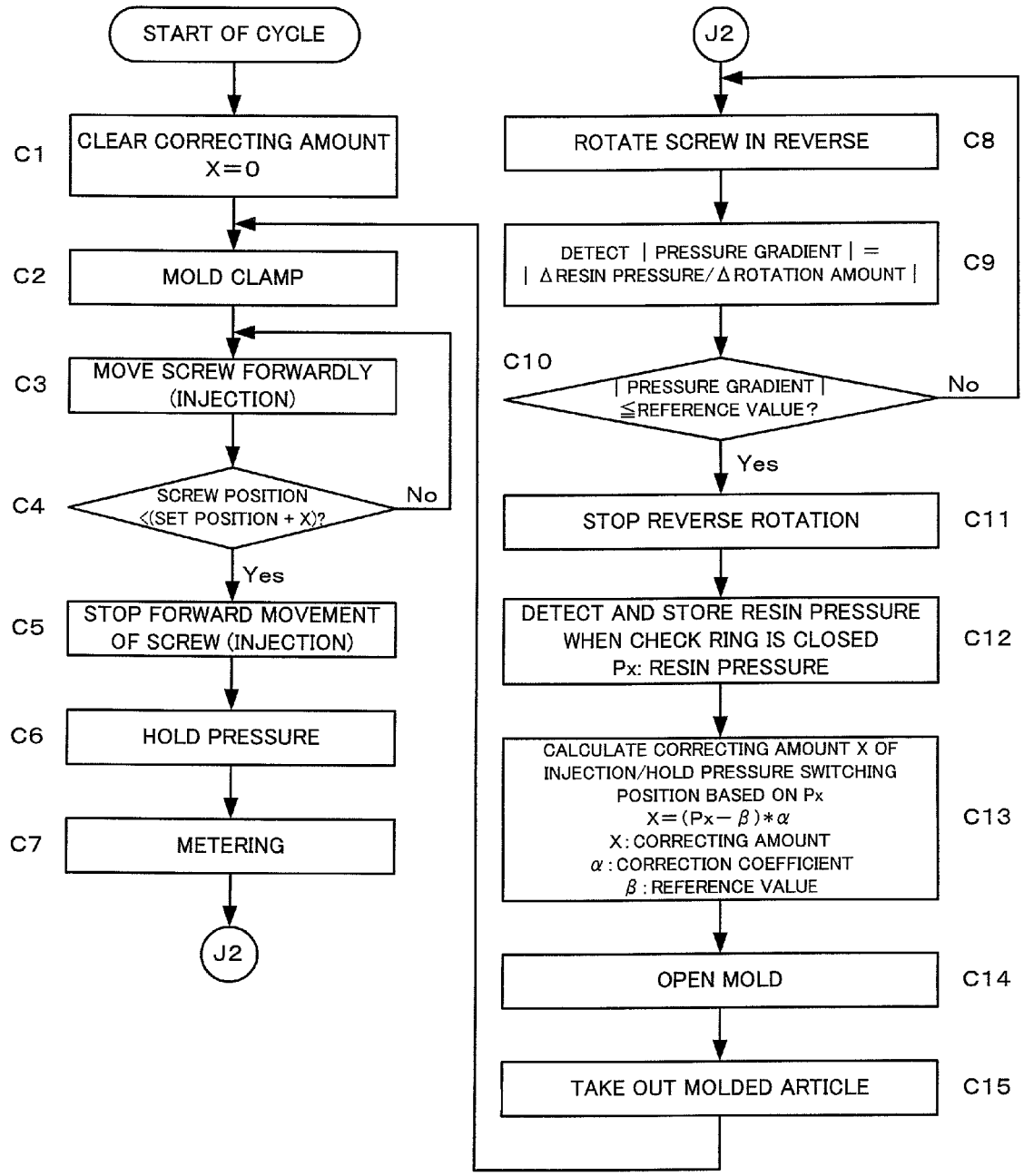
FIG. 5 is a flowchart showing an algorithm of one molding cycle including processing for calculating a correcting amount of injection/hold pressure switching based on the resin pressure at a point of time when the check ring is closed.

FIG. 5 is a flowchart showing an algorithm of one molding cycle including processing for calculating a correcting amount of injection/hold pressure switching position based on the resin pressure at the point of time when the check ring is closed.

A molding cycle is started, a register which stores a correcting amount X of an injection/hold pressure switching (VP switching) position is cleared (step C1), a clamping servomotor (not shown) is driven and controlled so that clamping is carried out (step C2). If the mold is closed until a set clamping force is generated, the injection servomotor 5 is driven and controlled through the servo-amplifier 14 by the servo-CPU 16, the screw 12 is moved forward, and molten resin which stays in the injection cylinder 2 at a front portion thereof is injected (step C3).

It is determined whether the current screw position reaches a set "injection/hold pressure switching position" (step C4). The "injection/hold pressure switching position", which is to be compared with the current screw position, is a value obtained by adding a correcting amount X (variable) calculated in later-described step C13 to a preset value (given value). If it is determined that the screw position does not reach the injection/hold pressure switching position yet, the procedure returns to step C3 to move the screw 12 forward, and molten resin staying in the injection cylinder 2 at a front portion thereof is injected into the mold. The processing in step C4, step C3 and step C4 are repeated, and if the screw position exceeds the injection/hold pressure switching position ('Yes' in determination in step C4), the forward movement of the screw (or injection) is stopped (step C5), and the procedure shifts to the hold pressure step (step C6).

If the hold pressure step is completed, the metering step is carried out (step C7). If the metering step is completed, the reverse rotation of the screw is started (step C8). Then, an absolute value of the pressure gradient is obtained from a variation of the resin pressure per unit variation of the screw reverse rotation (step C9), and it is determined whether the absolute value of the obtained pressure gradient is equal to or less than a preset reference value (step C10). While the absolute value of the pressure gradient is greater than the reference value, the procedure returns to step C8 from step C10, and the screw is rotated in reverse. The processing in step C10, step C8, step C9 and step C8 are repeated, and if the absolute value of the pressure gradient calculated in step C9 finally becomes equal to or less than the reference value while the screw is rotated in reverse ('Yes' in determination in step C10), the reverse rotation of the screw is stopped (step C11).

The resin pressure at the check ring closing timing (this timing is estimated by the point of time when the reverse rotation of the screw is stopped) is detected and stored (step C12), and the correcting amount X of the injection/hold pressure switching position is calculated based on the detected resin pressure Px (step C13). The correcting amount X is calculated by an equation $X=(Px-\beta)*\alpha$, using the detected resin pressure Px in the current cycle, a coefficient $\alpha$ and the reference value $\beta$.

Next, the mold is opened, the molded article is taken out (steps C14 and C15), and the one molding cycle is completed. Then, the procedure returns to step C2, and a next molding cycle is carried out.

In the processing shown in FIG. 5, the correcting amount of the injection/hold pressure switching position is calculated in step C13 based on the resin pressure Px which is a physical quantity. Other physical quantities than the resin pressure such as a pressure variation from the start of reverse rotation of the screw to the closing of the check ring, the screw reverse rotation amount from the start of the reverse rotation to the closing of the check ring, and time elapsed after the start of reverse rotation to the closing of the check ring may be employed, instead of the resin pressure Px, these physical quantities may be compared with the corresponding reference values to determine whether a molded article is non-defective or not. Further, two or more of the physical quantities may be selected to determine whether the molded article is non-defective or not using these selected physical quantities.

The invention claimed is:

1. An injection molding machine comprising an injection screw having a check ring, rotary drive means for rotating and driving the screw, axial drive means for driving the screw in an axial direction of the screw, rotation amount detection means for detecting a reverse rotation amount of the screw, and resin pressure detection means for detecting a resin pressure, the injection molding machine carrying out closing control of the check ring by rotating the screw in reverse, wherein said injection molding machine comprises:

resin pressure gradient detection means which rotates the screw in reverse in a state in which the screw is positioned in a predetermined position in the axial direction of the screw, and which detects a gradient of the resin pressure with respect to a reverse rotation amount of the screw in said closing control of the check ring based on the reverse rotation amount of the screw detected by said rotation amount detection means and the resin pressure detected by said resin pressure detection means; and check ring closing determination means which compares an absolute value of a resin pressure gradient detected by said resin pressure gradient detection means with a predetermined value, and which determines, based on the result of the comparison, that the check ring is closed or not.

2. The injection molding machine according to claim 1, further comprising means for obtaining the reverse rotation amount of the screw after the reverse rotation of the screw is started until said check ring closing determination means determines that the check ring is closed, and for displaying the obtained screw reverse rotation amount on a screen.

3. The injection molding machine according to claim 1, further comprising check ring closing control means for rotating the screw in reverse automatically until the check ring closing determination means determines that the check ring is closed.

4. The injection molding machine according to claim 1, wherein a physical quantity concerning injection molding is detected at a point of time when the check ring closing determination means determines that the check ring is closed, and it is determined, based on the detected physical quantity, whether a molded article is defective, wherein said physical quantity is one of a resin pressure at check ring closing timing, a variation of the resin pressure from start of reverse rotation of the screw until the check ring is closed, and time elapsed after the reverse rotation is started until the check ring is closed.

5. The injection molding machine according to claim 1, wherein a physical quantity concerning injection molding is detected at a point of time when the check ring closing determination means determines the check ring is closed, and the injection/hold pressure switching position or the injection speed switching position is corrected based on the detected physical quantity wherein said physical quantity is one of a resin pressure at check ring closing timing, a variation of the resin pressure from start of reverse rotation of the screw until the check ring is closed, and time elapsed after the reverse rotation is started until the check ring is closed.

* * * * *